United States Patent
Anderson et al.

(10) Patent No.: US 7,292,058 B2
(45) Date of Patent: Nov. 6, 2007

(54) METHOD FOR ESTIMATING THE EARLY FAILURE RATE OF SEMICONDUCTOR DEVICES

(75) Inventors: Thomas J. Anderson, Dallas, TX (US); John M. Carulli, Jr., Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 442 days.

(21) Appl. No.: 10/982,348

(22) Filed: Nov. 3, 2004

(65) Prior Publication Data

US 2006/0107094 A1    May 18, 2006

(51) Int. Cl.
*G01R 31/26* (2006.01)
(52) U.S. Cl. ..................................... 324/765
(58) Field of Classification Search ............... None
See application file for complete search history.

(56) References Cited

U.S. PATENT DOCUMENTS 6,445,969 B1 * 9/2002 Kenney et al. ............. 700/108
6,912,435 B2 * 6/2005 Pellegrini et al. .......... 700/121

OTHER PUBLICATIONS

Jedec Standard entitled "*Early Life Failure Rate Calculation Procedure for Electronic Components,*" JESD74, JEDEC Solid State Technology Association, Apr. 2000, 15 pages.

\* cited by examiner

*Primary Examiner*—Ernest Karlsen
*Assistant Examiner*—Trung Q. Nguyen
(74) *Attorney, Agent, or Firm*—Yingsheng Tung; Wade James Brady, III; Frederick J. Telecky, Jr.

(57) ABSTRACT

According to one embodiment of the invention, a method for estimating the failure rate of semiconductor devices includes obtaining accelerated stress duration data for a plurality of semiconductor devices, determining which of the semiconductor devices fail, classifying the defects for the failed semiconductor devices, determining a distribution model for the accelerated stress duration data, determining a set of parameters for the distribution model, determining a relative proportion of each defect classification to the total number of defect classifications, determining temperature and voltage acceleration factors for each defect classification, identifying actual operating conditions for the semiconductor devices, comparing the actual operating conditions for the semiconductor device with the distribution model, and determining a defect ratio for the semiconductor devices at the actual operating conditions for a predetermined time period based on the comparison.

20 Claims, 1 Drawing Sheet

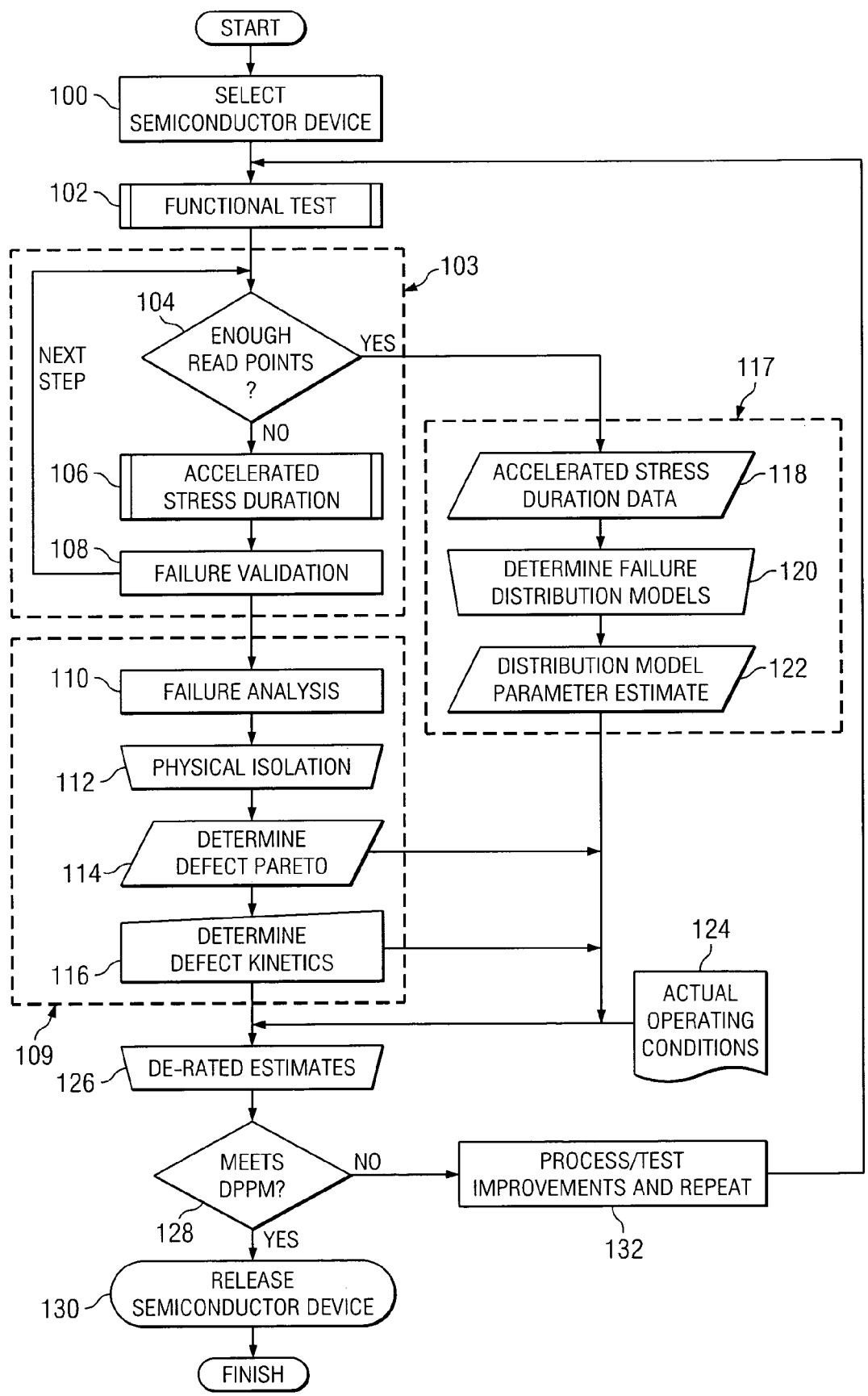

METHOD FOR ESTIMATING THE EARLY FAILURE RATE OF SEMICONDUCTOR DEVICES

TECHNICAL FIELD OF THE INVENTION

This invention relates generally to the field of semiconductor device testing and, more specifically, to a method for estimating the early failure rate of semiconductor devices.

BACKGROUND OF THE INVENTION

Understanding the defect levels of a semiconductor device during early use and the expected lifetime before wear out failure is important in many respects. This is the first experience a customer will have with the early reliability of a particular device. High temperature op-life ("HTOL") may confirm product life capability. ATE Test and accelerated stress tests are classic methods employed to reduce early failure rates. For the extrinsic residual defects, one must be able to estimate the level defects, for example DPPM, which remain prior to product shipment to customers. Until the defect levels are acceptable, cycles of accelerated stress evaluation and defect screening or reduction are necessary. The synergy between effective test methods and process improvements are driven by the results from accelerated stress tests.

SUMMARY OF THE INVENTION

According to one embodiment of the invention, a method for estimating the failure rate of semiconductor devices includes obtaining accelerated stress duration data for a plurality of semiconductor devices, determining which of the semiconductor devices fail, classifying the defects for the failed semiconductor devices, determining a distribution model for the accelerated stress duration data, determining a set of parameters for the distribution model, determining a relative proportion of each defect classification to the total number of defect classifications, determining temperature and voltage acceleration factors for each defect classification, identifying actual operating conditions for the semiconductor devices, comparing the actual operating conditions for the semiconductor device with the distribution model, and determining a defect ratio for the semiconductor devices at the actual operating conditions for a predetermined time period based on the comparison.

Some embodiments of the invention provide numerous technical advantages. Other embodiments may realize some, none, or all of these advantages. For example, in one embodiment, more accurate estimation of the early failure rate of an integrated circuit under customer use conditions is facilitated. Several operating conditions may be accommodated (active and standby). Estimates may be scaled by die size to permit estimation of devices that have yet to be characterized. In some embodiments, an estimation method disclosed herein allows quick determination and optimization of minimum accelerated stress test conditions for a specified customer quality level. Furthermore, only a minimal amount of samples for evaluation may be required to estimate these minimum accelerated stress test conditions.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIG. 1 is a flowchart illustrating a method for estimating the early failure rate of semiconductor devices according to one embodiment of the present invention.

DETAILED DESCRIPTION OF EXAMPLE EMBODIMENTS OF THE INVENTION

Example embodiments of the present invention and their advantages are best understood by referring now to FIG. 1 of the drawings, in which like numerals refer to like parts.

FIG. 1 is a flowchart illustrating an example method for estimating the early failure rate of semiconductor devices according to one embodiment of the present invention. The present invention contemplates the method outlined herein as being utilized with any suitable semiconductor devices, such as integrated circuits, within the teachings of the present invention. In addition, although the following detailed description discusses the defect ratio of semiconductor devices in defective parts per million ("DPPM"), the present invention contemplates the defect ratio of semiconductor devices being expressed in any suitable manner.

The example method begins at step 100 where a particular semiconductor device is selected. This semiconductor device may be a particular product, such as a particular integrated circuit, in which it is desired to estimate the early failure rate of this product in a cost efficient manner. As is the case with most semiconductor devices, the semiconductor devices of the selected type undergo functional testing, as indicated by step 102, to determine whether or not they work for their intended purpose. Assuming that the semiconductor devices work for their intended purpose, then the method continues at loop 103, which includes steps 104, 106, and 108.

Generally, the steps within loop 103 facilitate the obtaining of accelerated stress duration data for the semiconductor devices selected at step 100 and determining which of these semiconductor devices fail, if any. Hence, at step 106, the accelerated stress testing is performed until enough read points, as indicated by step 104, are obtained to get an adequate failure distribution of the semiconductor devices. The accelerated stress duration may be any suitable accelerated stress testing, such as burn-in, temperature cycling, or other suitable stress tests for the semiconductor devices. Any suitable accelerated stress conditions are contemplated by the present invention.

Step 108 is used to validate the failure of any of the semiconductor devices. In other words, step 108 is used to determine whether or not a particular semiconductor device that appears to have failed during the accelerated stress testing did, in fact, fail. For example, some data obtained from the accelerated stress testing may seem to indicate a failure but, in fact, it is not a failure for some suitable reason. Any suitable techniques may be utilized at this step to validate any failures of the semiconductor devices.

Accelerated stress testing continues until enough read points are obtained for an adequate failure distribution. As one example of obtaining enough read points, as indicated by step 104, burn-in data may be obtained at particular intervals that are equal in log time. Generally, however, a suitable number of cycles should be obtained in order to obtain adequate accelerated stress duration data for the semiconductor devices. In another embodiment of the invention, which is described in further detail below, there may be no failures obtained during the accelerated stress duration step 106. This is one advantage of the present invention is that allows for cases that have no failures at any of the intervals during the accelerated stress duration testing.

Assuming that failures were obtained during the accelerated stress duration step 106, the method then proceeds to steps 110 through 116, generally indicated by the dashed box 109. Referring first to step 110, a failure analysis is performed for the semiconductor devices that failed during the accelerated stress duration testing. This analysis may be performed using suitable electrical and/or physical failure analysis techniques that are well-known in semiconductor testing. Then, physical isolation of the defect is performed, as indicated by step 112. Once a defect location is isolated, one may assign a root cause mechanism. Various techniques facilitate the isolation of a defect including logic mapping, electrical bit-cell isolation, liquid crystal, and other suitable methods. A general aggregation of defect categories is uncovered during physical isolation. Steps 110 and 112 work in conjunction with one another to essentially classify the defects for the failed semiconductor devices. Examples of defects include metal shorts, metal opens, via voids, polysilicon residues, or other suitable defects. The defects may be any suitable size and any suitable type depending on the type of semiconductor devices being evaluated. Wafer fabrication techniques also are big factors in determining the type and size of defects.

Referring now to step 114, a defect pareto is determined. Generally, a relative proportion of each defect classification to the total number of defect classifications is determined at step 114. In other words, a ranking of the defect classifications is performed. As one example, metal shorts may make up 80 percent of the overall defects while the other 20 percent may be metal shorts. At step 116, the defect kinetics for the defect classifications are determined. In other words, the defect classification is mathematically defined. In one embodiment, step 116 involves determining the temperature and voltage acceleration factors for one or more of the defect classifications. In an embodiment of the invention where zero failures were detected during the accelerated stress testing, one may estimate the acceleration factors using any suitable method.

Referring now to dashed box 117 of the example method outlined in FIG. 1, the accelerated stress duration data, as indicated by step 118 is utilized herein to determine failure distribution models, as indicated in step 120. There may be different failure distribution models for each of the defect classifications. In addition, any suitable type of failure distribution model may be utilized within the teachings of the present invention, such as a grand distribution model, an independent distribution model, or a zero failure distribution model. Any suitable method may be utilized to determine the failure distribution models, such as regression analysis. As one example, a Weibull distribution may be adequate to describe how the semiconductor devices failed. For example, the Weibull cumulative distribution function ("CDF") may be utilized as indicated in equation one below:

$$R(t) = 1 - F(t) = \exp[-(t/\eta)^\beta] \quad (1)$$

where R(t) represents the surviving fraction and F(t) is the cumulative failing fraction of semiconductor devices after some stress time, t. The other parameters, $\beta$ and $\eta$, are the Weibull parameters that are determined from accelerated stress testing, as indicated by step 122, where the parameter estimation for the distribution model or models is determined. Again, one distribution model may be inadequate in some cases. The present invention contemplates any suitable number of distribution models to be employed.

A choice of a sample size for the semiconductor devices allows for a defect resolution to a desired failure level and at some predetermined confidence level. In one embodiment, the predetermined confidence level may be to detect 500 DPPM at a 90 percent confidence level. However, other suitable levels of extrinsic defects may be chosen by suitable adjustments, such as increasing the sample size. In an embodiment where zero failures are assumed, suitable sampling statistics theory may be utilized to obtain an upper limit of DPPM. For example, Chi-square sampling statistics may be utilized assuming zero failures.

Once the distribution model parameters are determined, whether by estimation or analysis, then the method continues at step 126 where the de-rating process takes place. In order to be able to de-rate the information obtained from the above steps, the actual operating conditions of the semiconductor devices should be identified, as indicated by step 124. For example, a particular semiconductor device may have a junction temperature of 65° C. and operating voltage of 1.3 volts. The actual operating conditions for the semiconductor device are then compared to the distribution model or models obtained in dashed box 117 of the method in order to determine a defect ratio for the semiconductor devices at the actual operating conditions for a predetermined time period.

Once the defect ratio is determined, it is determined whether or not it meets a predetermined DPPM, as indicated by step 128. If the defect ratio does not meet the desired DPPM, then the method continues at step 132 where process and/or testing improvements are made for the semiconductor devices in order to reduce the DPPM of the semiconductor devices. However, if the defect ratio meets the DPPM, then the method continues at step 130 where the semiconductor devices may be released for use and/or sent to customers. This then ends the example method outline of FIG. 1.

Referring back to step 126, as an example of the de-rating process using a Weibull distribution to obtain the distribution models and parameter estimates, the estimate of the residual or latent defect level, after burn-in for example, for a semiconductor device used for a particular period is the conditional failure probability. The failure is activated during some burn-in period and is equivalent to some de-rated period at actual operating conditions. These times are related by the acceleration factors of the defects, which were obtained during dashed box 109 and as described above. For example, equation 2 shows the relationship between burn-in duration to use duration.

$$t_{USE} = t_{BI} * AF \quad (2)$$

The acceleration factor for each defect has two parts, a thermal and a voltage term;

$$AF = AF_{Temperature} * AF_{Voltage} \quad (3)$$

The thermal acceleration may be calculated from the Arrhenius equation, where $E_a$ is the activation energy of the defect.

$$AF_{Temp} = \exp\left[-\frac{E_a}{k} * \left(\frac{1}{T_{BI}} - \frac{1}{T_{USE}}\right)\right] \quad (4)$$

There are many different models for the voltage acceleration estimates. In one embodiment, the following exponential relationship is utilized in this example. B is the voltage coefficient for activation of the defect.

$$AF_{Voltage} = \exp[B*(V_{BI} - V_{Use})] \quad (5)$$

All equations listed enable a de-rating of equivalent time at use to time in burn-in. Equation 6 describes a relationship of the burn-in Weibull scale parameter and that of the de-rated scale parameter.

$$\eta_{Use} = \eta_{BI} * AF \quad (6)$$

Finally, the conditional reliability for an arbitrary use period, with burn-in, may be found in Equation 7. (7)

$$R(t_{BI} \mid t_{Use}) = \exp\left[-\left(\frac{t_{BI}*AF + t_{Use}}{\eta_{BI}*AF}\right)^\beta\right] \Big/ \exp\left[-\left(\frac{t_{BI}}{\eta_{BI}}\right)^\beta\right] \quad (7)$$

This leads to Equation 8, the hazard function estimate over all defects, S, which is then scaled to DPPM and the cumulative contribution to the estimated defect level from the pareto.

$$DPPM = \left(\sum_{i=1}^{S} p * H_i\right) * 10^6, \text{ where } H_i = -\ln(R_i) \quad (8)$$

The equivalent residual reliability for each particular defect may be estimated by substituting the corresponding acceleration factors into Equation 8. The relative proportion of each defect found during accelerated stress duration testing is applied to the conditional hazard functions allowing a cumulative estimate of defect levels for arbitrary burn-in duration and use periods.

Thus, a method of identifying the defect ratio for semiconductor devices identifies not only the defect components, but the relative impact of each of the defects on the overall DPPM. Therefore one can develop a strategy of process and/or test improvements, as indicated by step 132, that may not be directed towards the highest contribution found in the defect pareto, as determined in step 114. The acceleration or lack thereof in some cases may identify those defects that require more aggressive attention to production and screening. One testing improvement that may be implemented is the selection of a burn-in cycle that is appropriate for characterizing test and process improvements until the requirements for volume production have been met. This allows a burn-in plan to be in place to ensure that the defects level remain acceptable. For example the method outlined herein may include determining an actual burn-in temperature and an actual burn-in duration for a semiconductor device based on a predetermined defect ratio and utilizing the temperature acceleration factor.

Calculations may also be easily adaptable to changes in actual product operating conditions so that the worst case operating conditions in a particular application may be assessed and still meet the DPPM goals. In one embodiment, one would only need to modify the relative acceleration factors for changes to the operating voltage and junction temperature.

Although embodiments of the invention and their advantages are described in detail, a person skilled in the art could make various alterations, additions, and omissions without departing from the spirit and scope of the present invention, as defined by the appended claims.

What is claimed is:

1. A method for estimating the failure rate of a semiconductor device, comprising:
    providing a first defect ratio for the semiconductor device;
    obtaining accelerated stress duration data for a plurality of the semiconductor device units;
    determining which of the plurality of the semiconductor device units fail;
    classifying the defects for the failed semiconductor device units;
    determining a distribution model for the accelerated stress duration data;
    determining a set of parameters for the distribution model;
    determining a relative proportion of each defect classification to the total number of defect classifications;
    determining temperature and voltage acceleration factors for each defect classification;
    identifying actual operating conditions for the semiconductor device;
    comparing the actual operating conditions for the semiconductor device with the distribution model;
    determining a defect ratio for the semiconductor device at the actual operating conditions for a predetermined time period based on the comparison, and
    releasing the semiconductor device for shipment to a customer if the defect ratio is lower than the first defect ratio.

2. The method of claim 1, wherein the accelerated stress duration data comprises burn-in data.

3. The method of claim 1, further comprising validating the accelerated stress duration data for the semiconductor device.

4. The method of claim 1, further comprising determining an actual burn-in temperature and an actual burn-in duration for the semiconductor device based on a predetermined defect ratio and utilizing a temperature acceleration factor.

5. The method of claim 1, further comprising identifying one among the plurality of defect classifications that failed the most units among the plurality of the semiconductor device units.

6. The method of claim 5, further comprising identifying an improvement to a process for manufacturing the semiconductor device based on the identification.

7. The method of claim 5, further comprising identifying an improvement to a test screening procedure for the semiconductor device based on the identification.

8. The method of claim 1, wherein determining a distribution model comprises determining a plurality of distribution models corresponding to respective ones of the defect classifications.

9. The method of claim 1, wherein determining the temperature and voltage acceleration factors for each defect classification comprises estimating the temperature and voltage acceleration factors for each defect classification.

10. A method for estimating the failure rate of a semiconductor device, comprising:
   providing a first defect ratio for the semiconductor device;
   obtaining accelerated stress duration data for a plurality of the semiconductor device units;
   determining that none of the semiconductor device units failed;
   estimating a distribution model for the accelerated stress duration data; determining a set of parameters for the distribution model;
   estimating temperature and voltage acceleration factors for a defect classification for the semiconductor devices;
   identifying actual operating conditions for the semiconductor devices; comparing the actual operating conditions for the semiconductor device with the distribution model;
   determining a defect ratio for the semiconductor devices at the actual operating conditions for a predetermined time period based on the comparison; and
   releasing the semiconductor device for shipment to a customer if the defect ratio is lower than the first defect ratio.

11. The method of claim 10, wherein the accelerated stress duration data comprises burn-in data.

12. The method of claim 10, further comprising validating the accelerated stress duration data for the semiconductor device.

13. The method of claim 10, further comprising determining an actual burn-in temperature and an actual burn-in duration for the semiconductor device based on a predetermined defect ratio and utilizing at least the temperature acceleration factor.

14. The method of claim 10, further comprising identifying an improvement to a process for manufacturing the semiconductor device based on the defect ratio determination.

15. The method of claim 10, further comprising identifying an improvement to a test screening procedure for the semiconductor device based on the defect ratio determination.

16. The method of claim 10, wherein estimating a distribution model comprises estimating a plurality of distribution models corresponding to respective ones of a plurality of defect classifications.

17. The method of claim 10, wherein estimating the temperature and voltage acceleration factors for a defect classification comprises estimating the temperature and voltage acceleration factors for a plurality of defect classifications.

18. The method of claim 10, further comprising selecting a sample size for the accelerated stress duration data based on a predetermined confidence level.

19. A method for estimating the failure rate of a semiconductor device, comprising:
   providing a first defect ratio for the semiconductor device;
   obtaining burn-in data for a plurality of the semiconductor device units;
   determining which of the semiconductor device units fail;
   classifying the defects for the failed semiconductor device units; determining a plurality of distribution models from the burn-in data corresponding to respective ones of the defect classifications;
   determining a set of parameters for each distribution model; determining a relative proportion of each defect classification to the total number of defect classifications;
   determining temperature and voltage acceleration factors for each defect classification;
   identifying actual operating conditions for the semiconductor device; comparing the actual operating conditions for the semiconductor device with one or more of the distribution models;
   determining a defect ratio for the semiconductor device at the actual operating conditions for a predetermined time period based on the comparison, and releasing the semiconductor device for shipment to a customer if the defect ratio is lower than the first defect ratio.

20. The method of claim 19, further comprising determining an actual burn-in temperature and an actual burn-in duration for the semiconductor device based on a predetermined defect ratio and utilizing the temperature and voltage acceleration factors.

* * * * *